United States Patent
Lipowsky et al.

(10) Patent No.: US 8,831,911 B2
(45) Date of Patent: Sep. 9, 2014

(54) DEVICE AND METHOD FOR MONITORING A GAS TURBINE

(75) Inventors: Holger Lipowsky, Stuttgart (DE); Stephan Staudacher, Tiefenbronn (DE)

(73) Assignee: MTU Aero Engines GmbH, Munich (DE)

( * ) Notice: Subject to any disclaimer, the term of this patent is extended or adjusted under 35 U.S.C. 154(b) by 792 days.

(21) Appl. No.: 12/991,322

(22) PCT Filed: Apr. 30, 2009

(86) PCT No.: PCT/DE2009/000631
§ 371 (c)(1),
(2), (4) Date: Jan. 28, 2011

(87) PCT Pub. No.: WO2009/135479
PCT Pub. Date: Nov. 12, 2009

(65) Prior Publication Data
US 2011/0153273 A1 Jun. 23, 2011

(30) Foreign Application Priority Data
May 8, 2008 (DE) .......................... 10 2008 022 459

(51) Int. Cl.
G01M 15/14 (2006.01)
G06F 11/30 (2006.01)
G06F 17/40 (2006.01)
G06F 19/00 (2011.01)
G05B 23/02 (2006.01)

(52) U.S. Cl.
CPC ............ *G05B 23/0254* (2013.01); *G06F 19/00* (2013.01); *G06F 17/40* (2013.01); *G01M 15/14* (2013.01); *G06F 11/30* (2013.01)
USPC ......... 702/182; 73/112.01; 73/865.8; 702/34; 702/187; 702/189

(58) Field of Classification Search
CPC ....... F01B 25/00; G01D 21/00; G01M 15/00; G01M 15/14; G06F 11/00; G06F 11/30; G06F 11/32; G06F 11/34; G06F 11/3409; G06F 11/3447; G06F 17/00; G06F 17/40; G06F 19/00
USPC ........ 73/86, 87, 112.01, 432.1, 865.8, 865.9; 702/1, 33, 34, 127, 179, 181, 182, 183, 702/187, 189; 708/100, 105, 200
IPC F01B 25/00; F02K 99/00; G01D 21/00; G01M 15/00,15/14; G06F 11/00, 11/30, 11/32, 11/34, G06F 11/3409, 11/3447, 17/00, 17/40, 19/00
See application file for complete search history.

(56) References Cited

U.S. PATENT DOCUMENTS 2,883,255 A * 4/1959 Anderson ........................ 346/34
3,362,217 A * 1/1968 Anthony et al. ............ 73/112.01
(Continued)

FOREIGN PATENT DOCUMENTS

DE 10 2008 022 459 A1 * 11/2009
EP 1 777 157 A1 4/2007
(Continued)

OTHER PUBLICATIONS

Mike West et al., Monitoring and Adaptation in Bayesian Forecasting Models, Journal of the American Statistical Association, Theory and Methods, Sep. 1986, vol. 81, No. 395, pp. 741-750.
(Continued)

*Primary Examiner* — Edward Cosimano
(74) *Attorney, Agent, or Firm* — Crowell & Moring LLP (57) ABSTRACT

A device and method for monitoring a gas turbine is disclosed. The device includes a receiver for receiving condition values of the gas turbine and an analytical device. The analytical device is designed to determine condition information from the condition values of the gas turbine using Bayes' Prediction.

11 Claims, 12 Drawing Sheets

(56) References Cited

U.S. PATENT DOCUMENTS

| | | | |
|---|---|---|---|
| 5,105,372 A | 4/1992 | Provost et al. | |
| 5,133,046 A * | 7/1992 | Kaplan | 706/52 |
| 6,324,659 B1 * | 11/2001 | Pierro | 714/48 |
| 7,254,491 B2 * | 8/2007 | Mylaraswamy et al. | 702/34 |
| 7,286,960 B2 * | 10/2007 | Jammu et al. | 702/182 |
| 7,308,385 B2 * | 12/2007 | Wegerich et al. | 702/183 |
| 7,406,399 B2 * | 7/2008 | Furem et al. | 702/182 |
| 7,539,597 B2 * | 5/2009 | Wegerich et al. | 702/185 |
| 7,689,394 B2 * | 3/2010 | Furem et al. | 703/8 |
| 7,734,443 B2 * | 6/2010 | De et al. | 702/132 |
| 7,941,306 B2 * | 5/2011 | Furem et al. | 703/8 |
| 8,046,191 B2 * | 10/2011 | Jammu et al. | 702/182 |
| 8,126,679 B2 * | 2/2012 | Jammu et al. | 702/182 |
| 8,275,576 B2 * | 9/2012 | Furem et al. | 702/182 |
| 8,306,797 B2 * | 11/2012 | Furem et al. | 703/8 |
| 8,437,904 B2 * | 5/2013 | Mansouri et al. | 701/29.1 |
| 8,510,083 B2 * | 8/2013 | Kipersztok et al. | 703/2 |
| 2002/0183971 A1 * | 12/2002 | Wegerich et al. | 702/185 |
| 2003/0139908 A1 * | 7/2003 | Wegerich et al. | 702/183 |
| 2004/0078171 A1 * | 4/2004 | Wegerich et al. | 702/188 |
| 2005/0028033 A1 * | 2/2005 | Kipersztok et al. | 714/27 |
| 2005/0081410 A1 * | 4/2005 | Furem et al. | 37/379 |
| 2005/0085973 A1 * | 4/2005 | Furem et al. | 701/50 |
| 2005/0288901 A1 * | 12/2005 | Mylaraswamy et al. | 702/185 |
| 2006/0036403 A1 * | 2/2006 | Wegerich et al. | 702/183 |
| 2006/0074591 A1 * | 4/2006 | Jammu et al. | 702/182 |
| 2006/0212281 A1 * | 9/2006 | Mathews et al. | 703/7 |
| 2007/0088570 A1 * | 4/2007 | Shetty et al. | 705/2 |
| 2008/0015816 A1 * | 1/2008 | Jammu et al. | 702/182 |
| 2008/0201108 A1 * | 8/2008 | Furem et al. | 702/182 |
| 2008/0312783 A1 * | 12/2008 | Mansouri et al. | 701/29 |
| 2009/0055070 A1 * | 2/2009 | De et al. | 701/100 |
| 2010/0185416 A1 * | 7/2010 | Furem et al. | 702/184 |
| 2010/0235142 A1 * | 9/2010 | Jammu et al. | 702/183 |
| 2011/0231169 A1 * | 9/2011 | Furem et al. | 703/2 |

FOREIGN PATENT DOCUMENTS

| | | |
|---|---|---|
| FR | 2 883 330 A1 | 9/2006 |
| GB | 2450241 B * | 12/2011 |
| WO | WO 2007/060446 A1 | 5/2007 |

OTHER PUBLICATIONS

Dirk Therkorn, Remote Monitoring & Diagnostic for Combined-Cycle Power Plants, Proceedings of GT2005, ASME Turbo Expo 2005, Power for Land, Sea and Air, Jun. 6-9, 2005, Nevada, USA, GT2005-68710, seven (7) pages.

* cited by examiner

DEVICE AND METHOD FOR MONITORING A GAS TURBINE

This application claims the priority of International Application No. PCT/DE2009/000631, filed Apr. 30, 2009, and German Patent Document No. 10 2008 022 459.6, filed May 8, 2008, the disclosures of which are expressly incorporated by reference herein.

BACKGROUND AND SUMMARY OF THE INVENTION

The present invention relates to a device and a method for monitoring a gas turbine.

The condition of gas turbines deteriorates over the operating life. In this case, the condition can deteriorate because of aging phenomena or because of individual events. Examples of aging phenomena are erosion or corrosion. An individual event can be damage from foreign matter that gets sucked in. Whereas the consequence of aging phenomena is a gradual deterioration of all components of the gas turbine, in certain circumstances to varying degrees, individual events result in rapid changes to the performance parameters of a few components.

Performance calculation programs that simulate the operating behavior of the gas turbine in an undeteriorated condition are used to monitor gas turbines. This makes it possible to determine, for every operating point, expected values for the corresponding measured variables. The deviations between the expected values and measured values, called residua, represent the basis for monitoring the gas turbine.

In the case of individual events, rapid changes are to be expected in the residua. Identifying these changes as promptly as possible is the objective of detection. In the case of positive detection, the objective of diagnostics is identifying the affected components. With both positive and negative detection, the objective of prognosis is predicting the further course of the respective parameters so as to prevent limit values from possibly being exceeded. In particular with respect to monitoring a plurality of gas turbines, e.g., fleet of engines, it is of crucial importance to automate the task of detection.

The traditional, prevailing maintenance philosophy for gas turbines consists of maintenance according to specified cycles with simultaneously monitoring of global parameters, such as, the turbine outlet temperature or specific fuel consumption. These global parameters are merely monitored with respect to specified limit values being exceeded.

Since the 1990s a change has been recognizable in the maintenance philosophy from time-based maintenance to condition-based maintenance. The condition-based maintenance requires precise knowledge of the condition of the respective gas turbine, which is supposed to be made available by so-called engine health monitoring systems (EHM systems). U.S. Pat. No. 5,105,372 describes such a system, which is based on the use of a Kalman filter. The objective of detection is not described explicitly in this system; diagnostics are carried out independent of a rapid change in the residua. No detection functions are defined. The task of prognosis is carried out with the aid of a Kalman filter. The prognosis function is limited to predicting linear trends and does not supply any information about a confidence interval of the prediction.

In the case of monitoring statically defined limit values, a malfunction is not identified until the change in the operating behavior has reached a specific level. No detection or prognosis functions are present.

In addition, artificial intelligence methods are increasingly being applied, such as, neural networks, fuzzy logic, genetic algorithms. The system described in Therkorn's "Remote Monitoring and Diagnostic for Combined-Cycle Power Plants," for example, searches using appropriately trained neural networks for known patterns in residua and derived quantities, and triggers a detection alarm in the case of positive pattern recognition.

All systems based on neural networks must be specially trained and configured for known faults and for each individual gas turbine type.

The object of the present invention is creating an improved device and an improved method for monitoring a gas turbine.

The approach according to the invention is suitable for detection and prognosis within the framework of condition monitoring of gas turbines. In this case, the present invention is based on the knowledge that the method of Bayes' Prediction can be used advantageously in the area of gas turbine monitoring. In particular, the objective of detection can be attained by the use of the method of Bayes' Prediction.

The present invention creates a device for monitoring a gas turbine having the following features:
a receiver for receiving condition values of the gas turbine; and
an analytical device, which is designed to determine condition information from the condition values of the gas turbine using Bayes' Prediction.

Furthermore, the present invention creates a method for monitoring a gas turbine, which features the following steps:
receiving condition values of the gas turbine; and
determining condition information of the gas turbine from the condition values using Bayes' Prediction.

According to one embodiment, the condition values may be residua. The residua can be observed in terms of their temporal progressions and be described by so-called dynamic linear models (DLM). In this case, dynamic linear models can be used such as those described in Pole, West, Harrison: "Applied Bayesian Forecasting and Time Series Analysis," Chapman & Hall, 1994, or in West, Harrison: "Bayesian Forecasting and Dynamic Models," Second Edition, Springer, 1997 or in West, Harrison: "Monitoring and Adaptation in Bayesian Forecasting Models," Journal of the American Statistical Association, September 1986, Vol. 81, No. 395, Theory and Methods, 1986. As a result, it is possible, at any point in time, to indicate an expected probability density for the next time interval.

According to one embodiment, detection of rapid changes in the residua can be achieved with the aid of so-called Bayes' factors. To this end, the probability density of a current model can be compared at any point in time to the probability density of an alternative model, whose mean value is offset by a specific amount with respect to the current model. In order to design the precision of the method in an optimum way and simultaneously minimize the number of false alarms, according to the invention, a chain of logical queries are made, which are used, among other things, to calculate cumulative Bayes' factors and the associated run lengths. The chain of logical queries for the detection of rapid changes in the residua can be developed based on the theory described in West, Harrison: "Bayesian Forecasting and Dynamic Models," Second Edition, Springer, 1997.

Preferred exemplary embodiments of the present invention are explained in greater detail in the following, making reference to the enclosed drawings.

DETAILED DESCRIPTION OF THE DRAWINGS

In the following description of the preferred exemplary embodiments of the present invention, the same or similar reference numbers are used for the elements depicted in the various drawings and those elements having a similar effect, wherein a repetition of the description of these elements is omitted.

Figure 1:
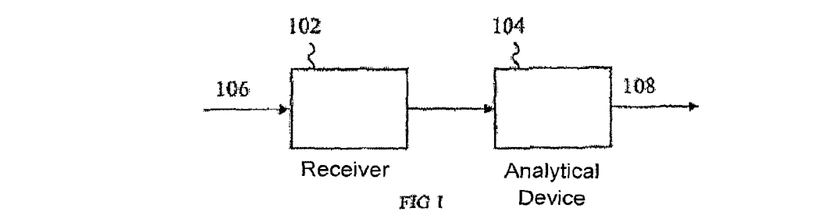
FIG. 1 is a schematic representation of device according to the invention for monitoring a gas turbine.

FIG. 1 shows a device for monitoring a gas turbine, according to an exemplary embodiment of the present invention. The device has a receiver 102 and an analytical device 104. The receiver 102 is designed to receive condition values 106 of the gas turbine and to make them available to the analytical device 104. The analytical device 104 is designed to determine condition information 108 of the gas turbine from the condition values 106. In particular, the analytical device 104 is designed to determine the condition information 108 based on the method of Bayes' Prediction. The analytical device 104 can be designed to indicate the condition information 108 or make it available for further processing.

The condition values 106 may be measured values of the gas turbine. Moreover, the condition values may be residua, which identify respectively a deviation of a measured value of the gas turbine from an expected value assigned to the measured value.

The condition information 108 may be used in detection and/or prognosis within the scope of condition monitoring or operating behavior of the gas turbine. For example, the analytical device 104 may be designed within the scope of detection to identify a rapid change in the condition values 106 as condition information 108. Moreover, the analytical device may be designed to identify a prognosis about a future course of the condition values as condition information 108.

According to one exemplary embodiment, the analytical device 104 may be designed to describe the condition values 106 by at least a dynamic linear model in order to identify the condition information 108. The dynamic linear model may be designed to describe at least one linear trend of the condition values 106. Alternatively or additionally, the dynamic linear model can be designed to describe at least one higher order polynomial trend of the condition values 106.

Moreover, the analytical device 104 may be designed to identify probability densities of a current dynamic linear model as well as at least of an alternative dynamic linear model. The alternative model differs from the current model in that its mean value is offset by a specific value with respect to a mean value of the current model. To determine the condition information 108, the analytical device 104 may be designed to compare the probability density of the current model with the probability density of the alternative model.

Furthermore, the analytical device 104 may be designed to identify the condition information 108 on the basis of Bayes' factors. To this end, the analytical device 104 may be designed to identify the Bayes' factors from the probability density of the current dynamic linear model and the probability density of the alternative dynamic linear model. In addition, the analytical device 104 may be designed to identify the condition information 108 by the calculation of cumulative Bayes' factors.

An advanced monitoring system for gas turbines is described on the basis of the following figures, functions and detection algorithms. In this case, the objective of detection is attained by the use of the method of Bayes' Prediction (also called Bayesian Forecasting).

The idea of dynamic linear models (DLM) consists of breaking down the process to be observed into several components. When using second order DLM these are the components "value" and "gradient" and when using third order DLM the component of "curvature" is also added. The following applies when using second order DLM:

Measurement $Y_t = \mu_t + \upsilon_t$

Value $\mu_t = \mu_{t-1} + \beta_{t-1} + \omega_{1t}$ gradient $\beta_t = \beta_{t-1} + \omega_{2t}$ wherein $Y_t$ represents the measured value of the process being observed, $\mu_t$ its mean value and $\beta_t$ its local gradient. The measured value $Y_t$ is composed thereby of $\mu_t$ and a variance $\upsilon_t$, which represent uncertainties in the measurement and modeling precisions. The value of the to-be-observed process $\mu_t$ is composed in turn of the process value for the previous time interval $\mu_{t-1}$, the gradient of the previous time interval $\beta_{t-1}$ and a value variance $\omega_{1t}$, which reflects the changes in the process value between two time intervals. The gradient $\beta_t$ finally corresponds to its value from the previous time interval $\beta_{t-1}$ and a gradient variance $\omega_{2t}$, which represent the changes in the gradient between two time intervals.

Figure 2:
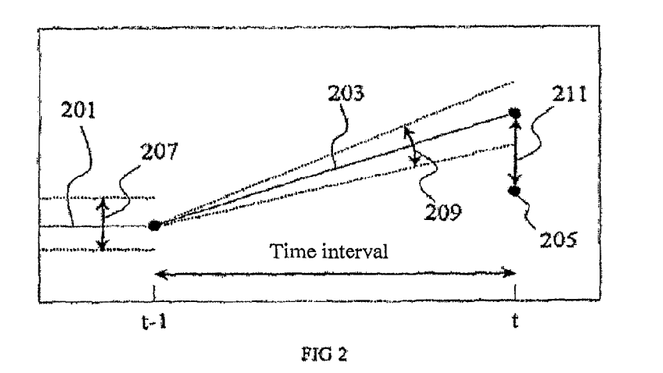
FIG. 2 is a representation of a breakdown of a process.

This produces the following representation in matrix notation:

$$Y_t = \begin{pmatrix} 1 \\ 0 \end{pmatrix}' \cdot \begin{pmatrix} \mu \\ \beta \end{pmatrix}_t + v_t$$

$$\begin{pmatrix} \mu \\ \beta \end{pmatrix}_t = \begin{pmatrix} 1 & 1 \\ 0 & 1 \end{pmatrix} \cdot \begin{pmatrix} \mu \\ \beta \end{pmatrix}_{t-1} + \begin{pmatrix} \omega_1 & 0 \\ 0 & \omega_2 \end{pmatrix}_t$$

or in short:

$$Y_t = F_t' \cdot \Theta_t + v_t$$

$$\Theta_t = G_t \cdot \Theta_{t-1} + W_t$$

with $\Theta = \begin{pmatrix} \mu \\ \beta \end{pmatrix}$, $F = \begin{pmatrix} 1 \\ 0 \end{pmatrix}$, $G = \begin{pmatrix} 1 & 1 \\ 0 & 1 \end{pmatrix}$, $W = \begin{pmatrix} \omega_1 & 0 \\ 0 & \omega_2 \end{pmatrix}$ FIG. 2 depicts the breakdown of a process in accordance with a second order DLM. 201 identifies the component "value" ($\mu_t$), 203 the component "gradient" ($\beta_t$), 205 the measurement $Y_t$, 207 the value variance $\omega_{1t}$, 209 the gradient variance $\omega_{2t}$ and 211 the measuring variance $\upsilon_t$. With respect to applying DLM to the diagnostics of gas turbines, the to-be-observed processes are the temporal progressions of the residua.

An essential feature of the method of Bayes' Prediction is the description of the observed process with the aid of probability density functions.

Figure 3:
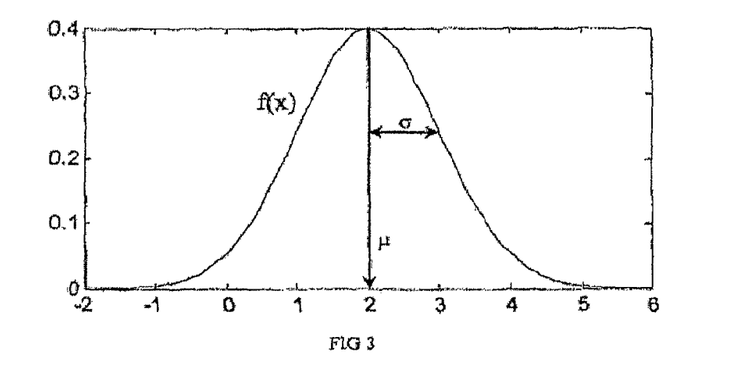
FIG. 3 illustrates a probability density function.

FIG. 3 shows the probability density function:

$$f(x) = \frac{2}{\sigma\sqrt{2\pi}} \cdot \exp\left(-\frac{1}{2} \cdot \left(\frac{x-\mu}{\sigma}\right)^2\right)$$

wherein σ is the standard deviation and μ is the mean value.

In the following, a shortened form is used to represent parameters, which are described by probability density functions. In this case, θt designates the density function of the parameter and Dt the entirety of all parameters from Y1 to Yt. The notation should be read as follows: The density function θt of the parameter with knowledge of the parameter entirety Dt is normally distributed with the mean value mt and the variance Ct.

The following applies to the information equation:

$$(\Theta_{t-1}|D_{t-1}) \sim N[m_{t-1}, C_{t-1}]$$

$$(\Theta_t|D_{t-1}) \sim N[a_t, R_t]$$

The following applies to the 1-step forecast equation:

$$(Y_t|D_{t-1}) \sim N[f_t, Q_t]$$

The following applies to the update equations:

$$(\Theta_t|D_t) \sim N[m_t, C_t]$$

The following applies to the k-step forecast equations:

$$(\Theta_{t+k}|D_t) \sim N[a_t(k), R_t(k)]$$

$$(Y_{t+k}|D_t) \sim N[f_t(k), Q_t(k)]$$

The mean values m, a and f as well as the associated variances C, R and Q are calculated respectively in accordance with Pole, West, Harrison: "Applied Bayesian Forecasting and Time Series Analysis," Chapman & Hall, 1994. The information equations describe the calculation of "value" and "gradient" at time t with the knowledge of the measurements until time t−1 (a priori). The 1-step forecast equation supplies a prediction for the measured value at time t with knowledge of the measurements until time t−1. The update equations calculate the components "value" and "gradient" according to the measurement at time t (a posteriori). The k-step forecast equations finally supply a prediction for value, gradient and measured value for the next k time intervals.

Figure 4:
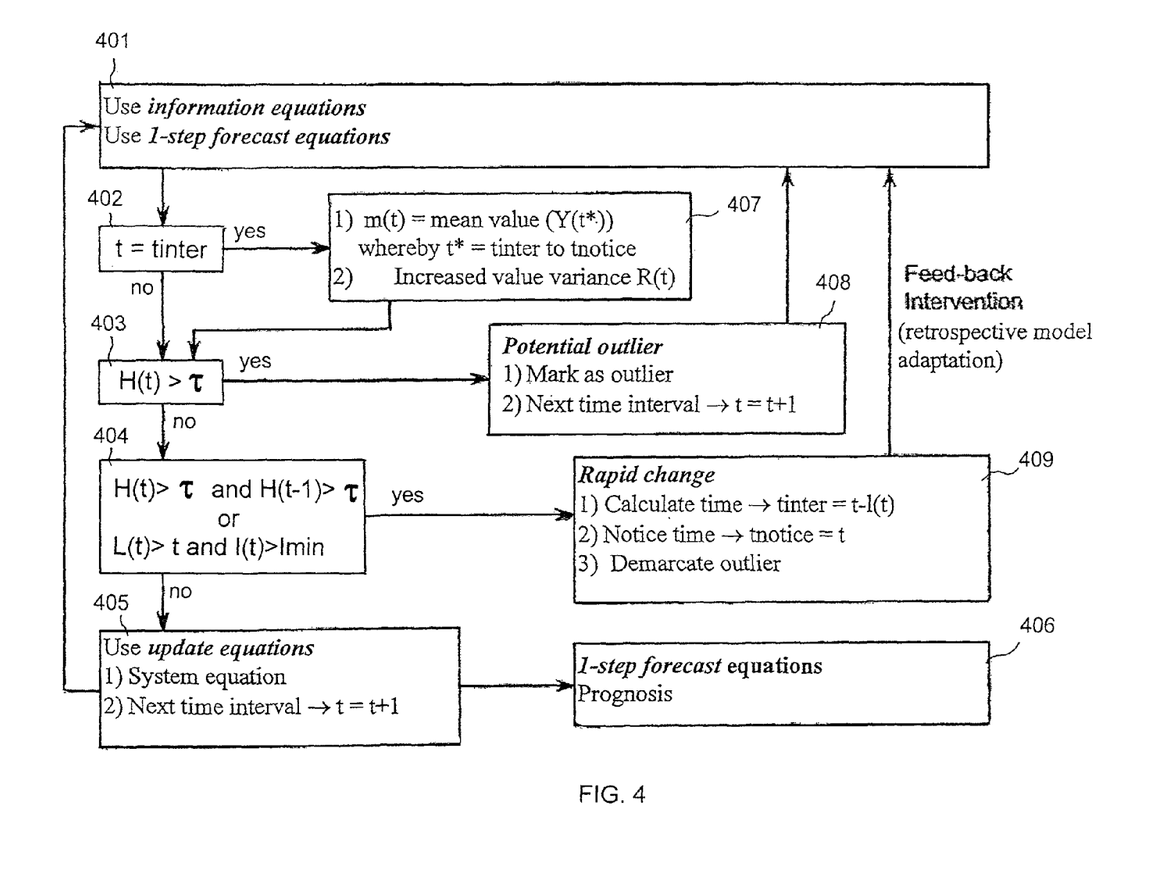
FIG. 4 is an algorithm for detecting outliers.

FIG. 4 shows the algorithm for detecting outliers, intervention and prognosis.

In general, the Bayes' factor describes the ratio between the probability density functions of the current and alternative models. In the case of the normal distribution used, the Bayes' factor can be represented as:

$$H_t = \exp\left(\frac{2h \cdot (Y_t - f_t) - h^2}{2 \cdot Q_t}\right)$$

Figure 5:
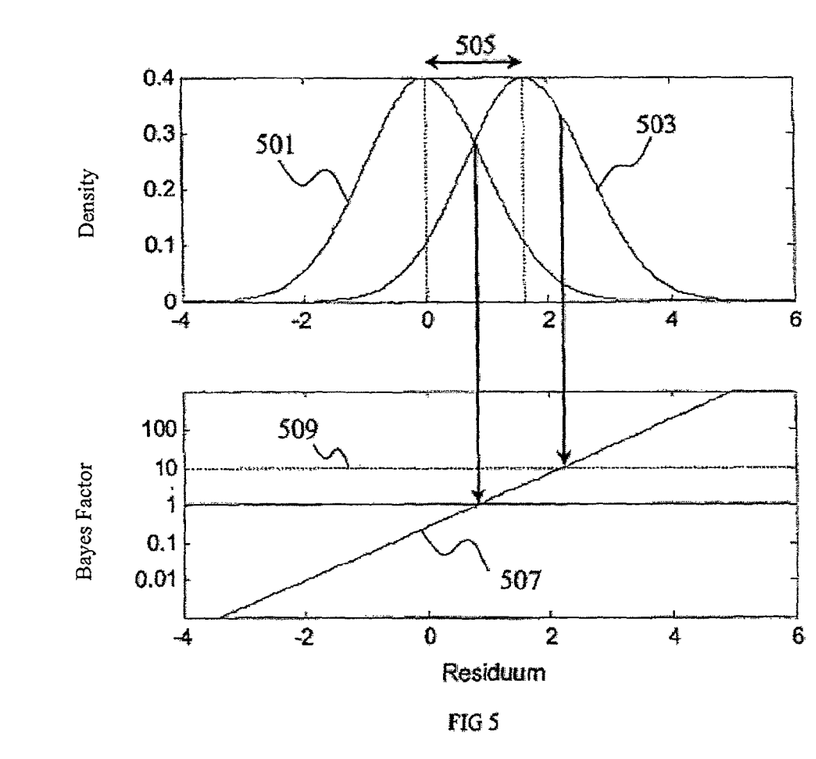
FIG. 5 illustrates an interrelationship between models and the Bayes' factor.

FIG. 5 shows the interrelationship between the probability distributions and the Bayes' factor. 501 designates the probability distribution of the current model, 503 that of the alternative model, 505 the offset h of the mean values of the two distributions and 507 the progression of the Bayes' factor. In the depicted example, it is h=1.645. What is crucial is that the Bayes' factor represents a monotonously increasing function, i.e., the greater the residuum, the greater the Bayes' factor. A threshold value 509 can be hereby defined, which, when exceeded, a measured value can be identified as a potential outlier or rapid change.

In addition, cumulative Bayes' factors are used to answer the question of whether several successive measured values indicate a rapid change of the residua. The following applies to the cumulative Bayes' factor L(t):

$$H_t(k) = \prod_{t-r+1} H_t \quad m = 1, 2, \ldots, l_{max}$$

$$L_t = \max_{1 \le k \le r} H_t(k) \quad n' = 1_t$$

wherein Ht(k) is the product of the last lmax Bayes' factors and lt is the run length. The run length lt is determined such that the product of the last lt Bayes' factors is maximum. This maximum product corresponds to the cumulative Bayes' factor. With this method, it is possible to detect rapid changes, whose order of magnitude lies in the vicinity of the standard deviation of the process being observed. If the use of cumulative Bayes' factors is dispensed with, the observation limit lies at multiples of the process standard deviation.

Figure 6:
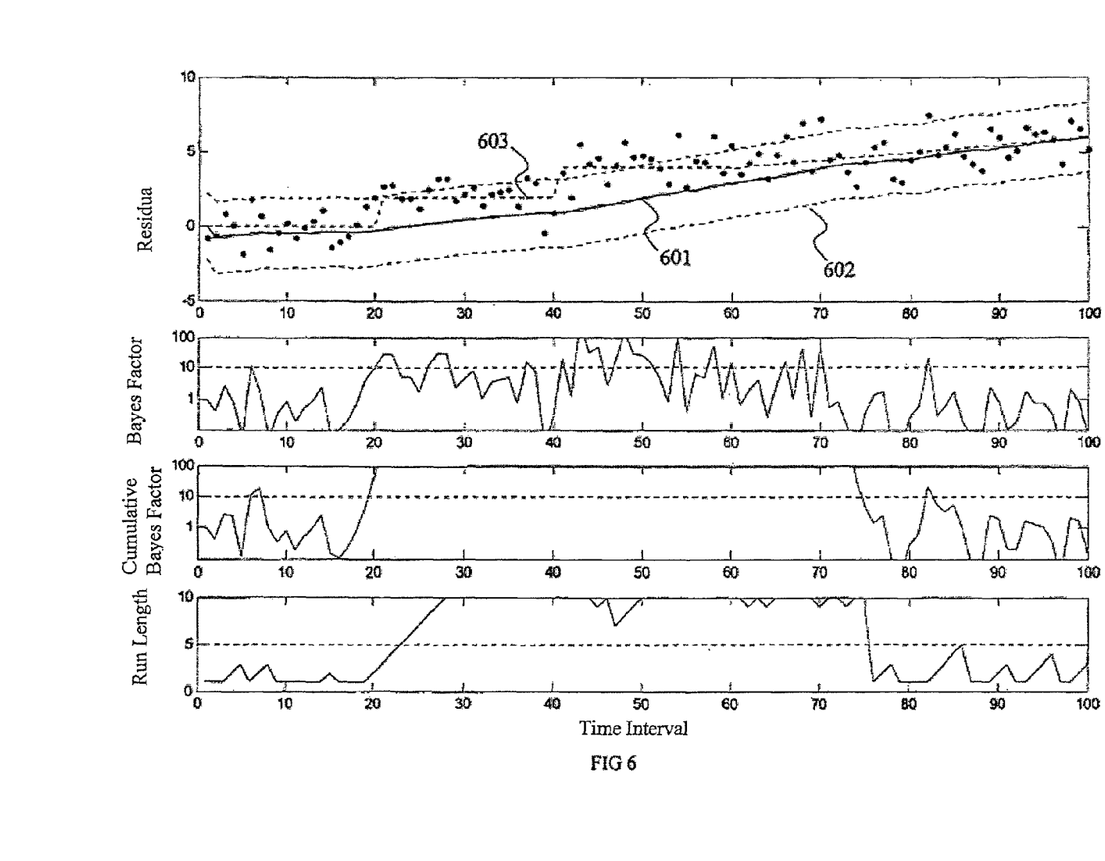
FIGS. 6 to 13 illustrate a temporal progression of the residua, the Bayes' factor $H_t$, as well as the values $L(t)$ and $I(t)$.

FIG. 6 shows a temporal progression of the residua, of the Bayes' factor Ht, of the cumulative Bayes' factor L(t) as well as of the run length l(t) over time t.

The reference number 601 designates the mean value $\mu_t$ of the current model and reference number 602 a confidence interval. In the depicted example, the confidence interval includes 97.56% of all residua. 603 designates the true progression of the observed process. It shows that this experiences a respective rapid change of +1 at the time intervals t=21 and t=41 and a gradual change of +0.05 per time interval starting with interval t=61. Reconstructing this true process curve from the residua is the core of the present invention.

Figure 7:
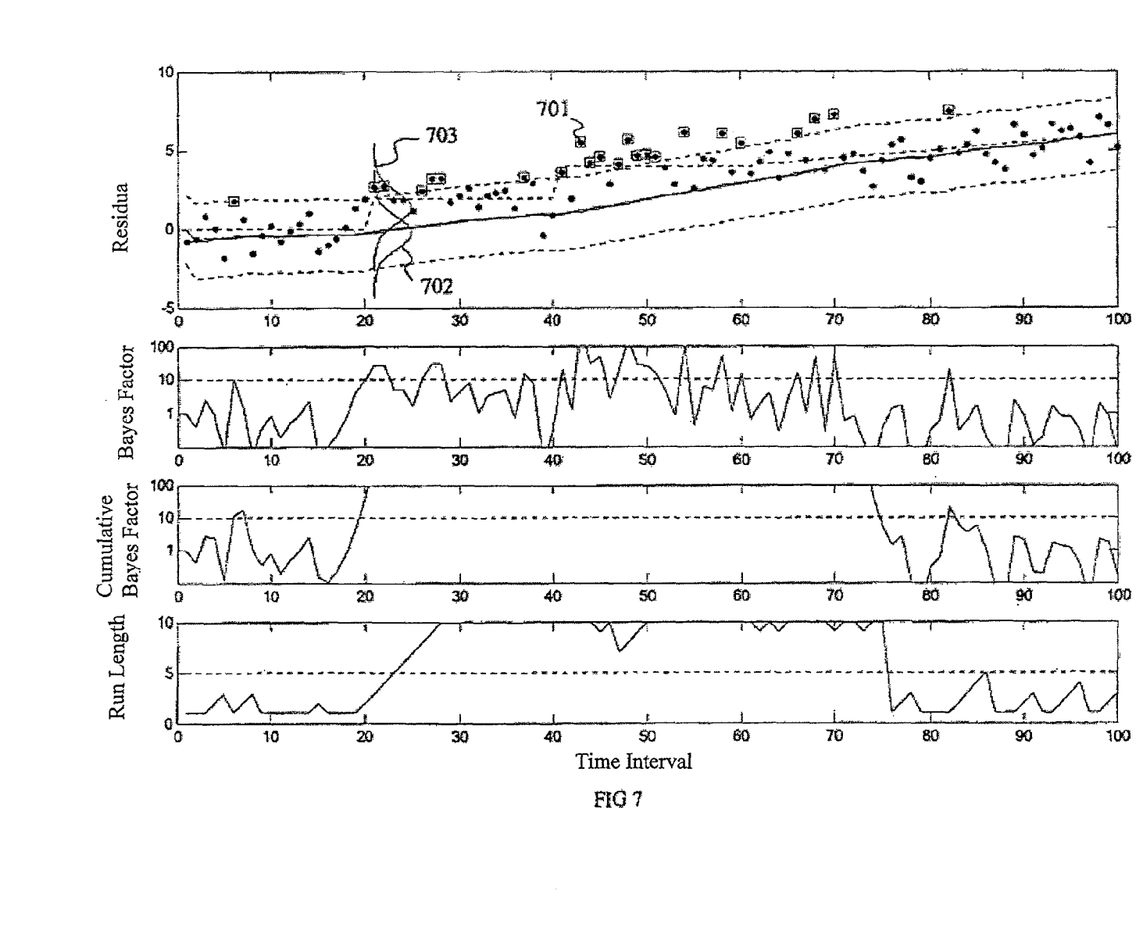

FIG. 7 shows the same process curve as FIG. 6. The threshold value τ=10 was defined for the Bayes' factors, which, when the threshold value was exceeded, the corresponding residua were marked as potential outliers 701. 702 designates the probability density function of the current model, and 703 that of the alternative model.

Figure 8:
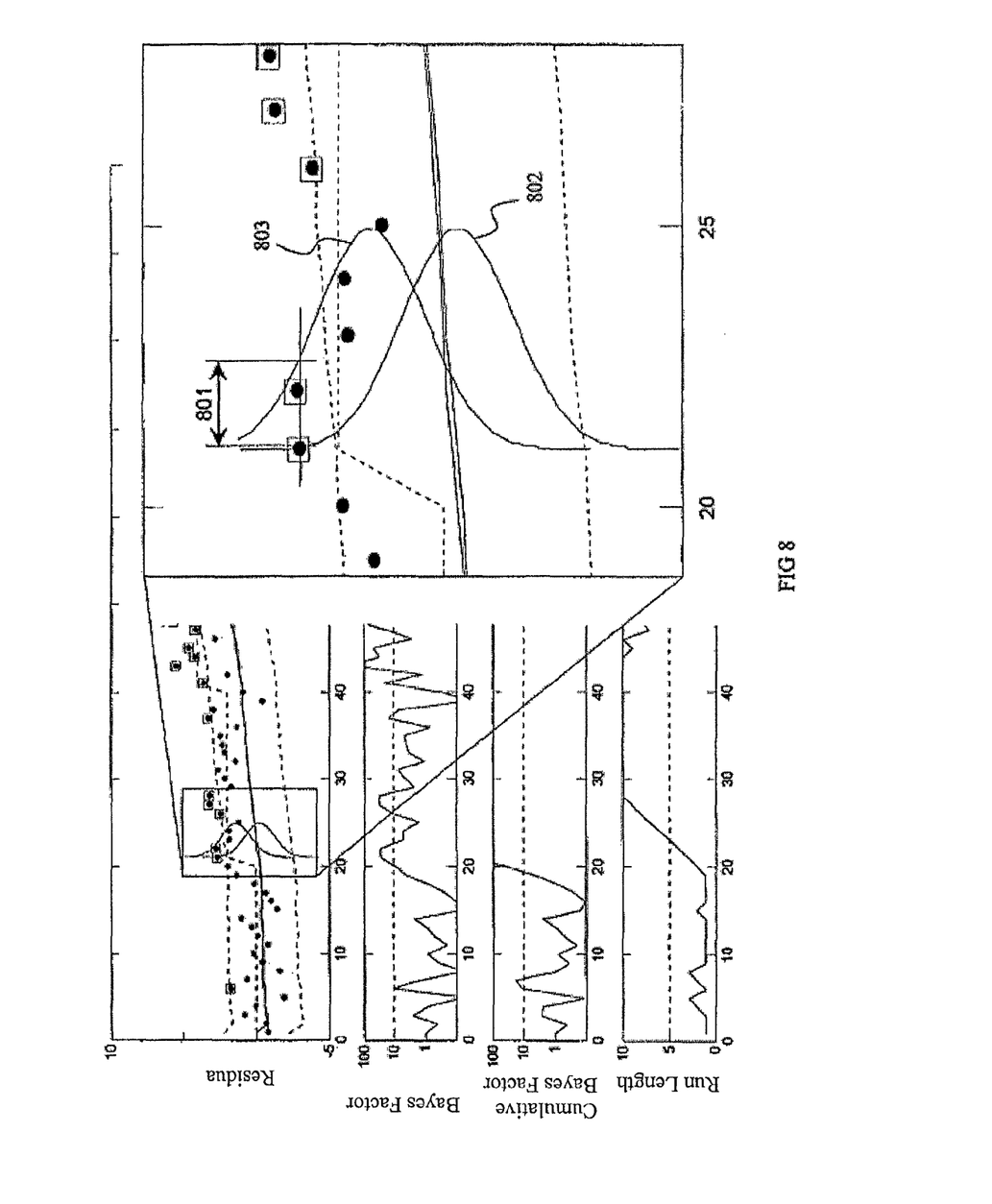

FIG. 8 shows a section of the curved depicted in FIG. 7. 801 designates the ratio of the two probability functions 802 and 803. It shows that the residuum at time t=21 has a high Bayes' factor, and is therefore either an outlier or the beginning of a rapid change. In addition, it can be seen that at times t=21 and t=22, Bayes' factors greater than τ respectively occur, which indicates a rapid change. In this case, a rapid change is established even without the aid of cumulative Bayes' factors and run lengths.

Figure 9:
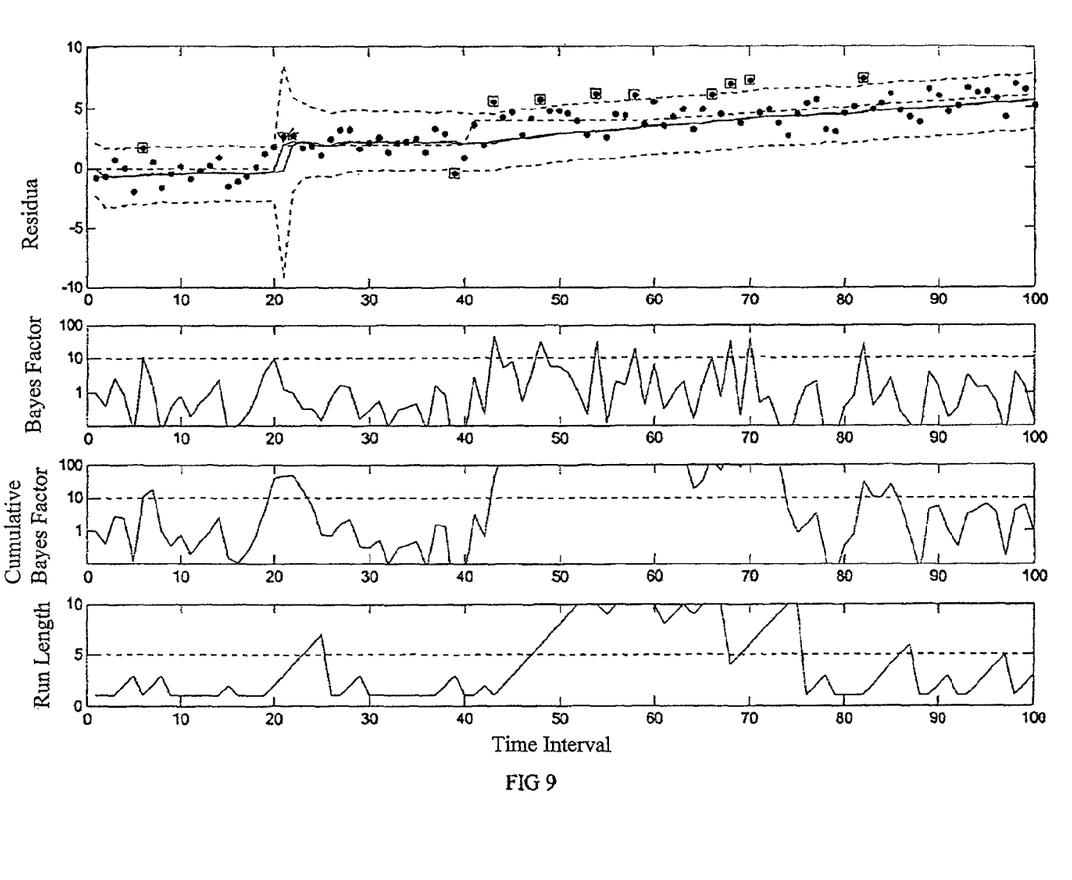

FIG. 9 shows the same process curve as FIG. 7.

At time t=21, a model adaptation was carried out, because Bayes' factors greater than τ occurred in the case of two successive residua.

Figure 10:
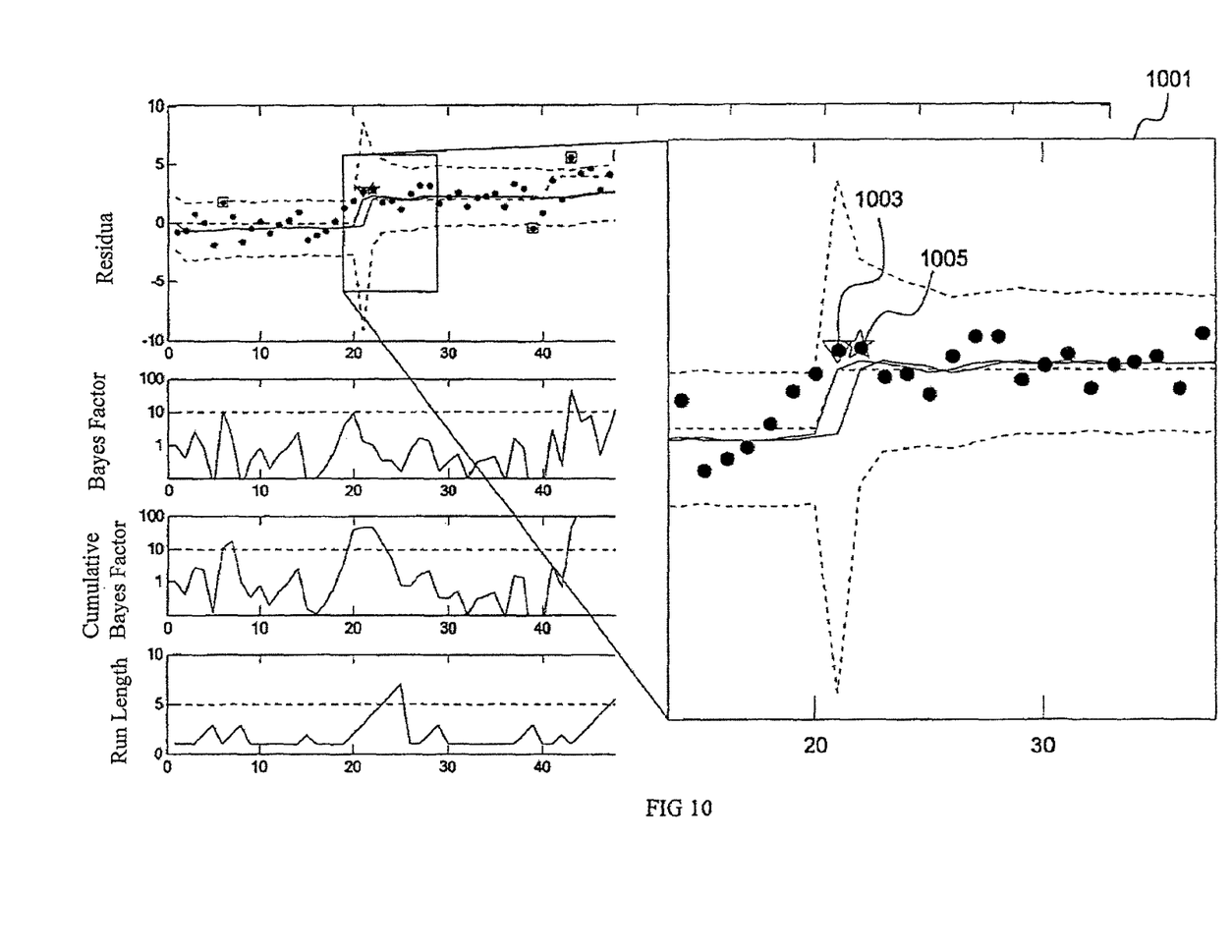

FIG. 10 shows a section of the curve depicted in FIG. 9. The enlarged section of the image 1001 shows an occurrence 1003 of a change and detection 1005 of the change. The change occurred at time t=21 and was detected at time t=22. In this case, the retrospectivity of the model adaptation is one time interval.

FIG. 9 further shows that at time interval t=41, no successive Bayes' factors greater than t occurred. Detecting the change occurring at t=41 requires the aid of cumulative Bayes' factors and run lengths. It shows that starting at t=43 cumulative Bayes' factors greater than τ occur. A threshold value $l_{min}$ can be defined for the run length and in the depicted example is set at $l_{min}$=5. This threshold value is reached at t=48. At this time, 5 successive points indicate a change in the residua, which took place at t=43.

Figure 11:
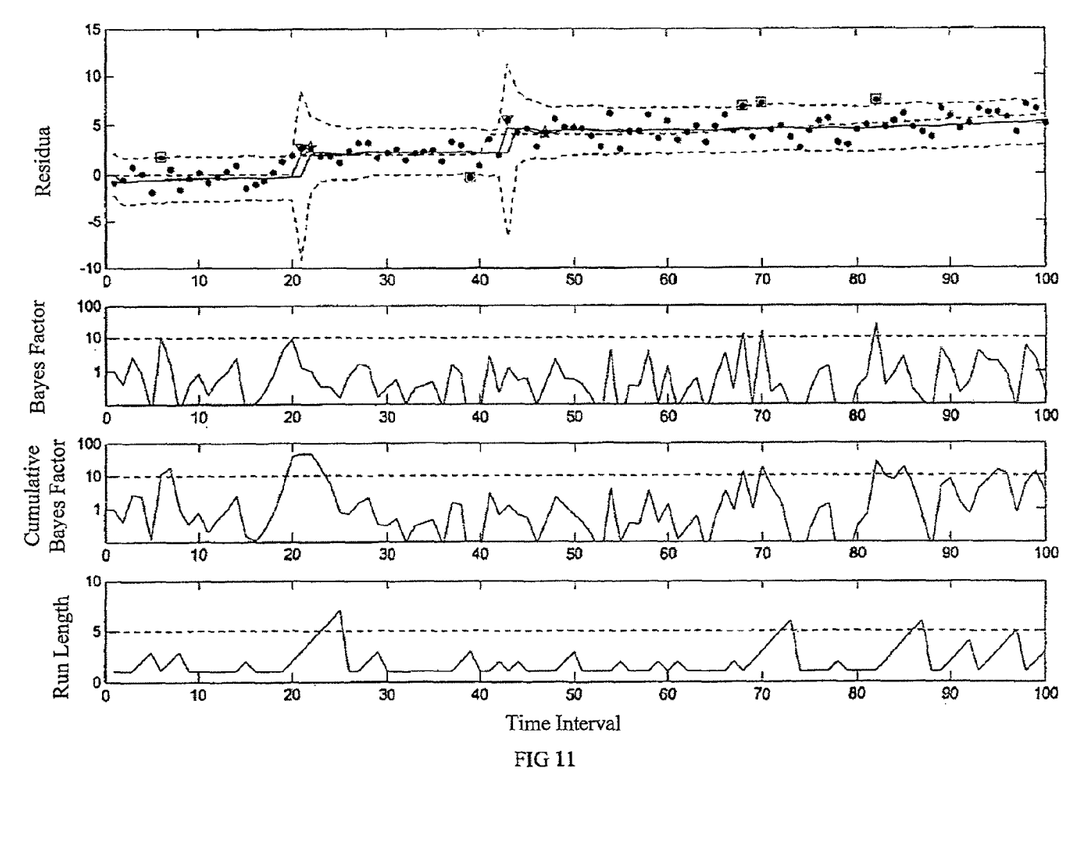
Figure 12:
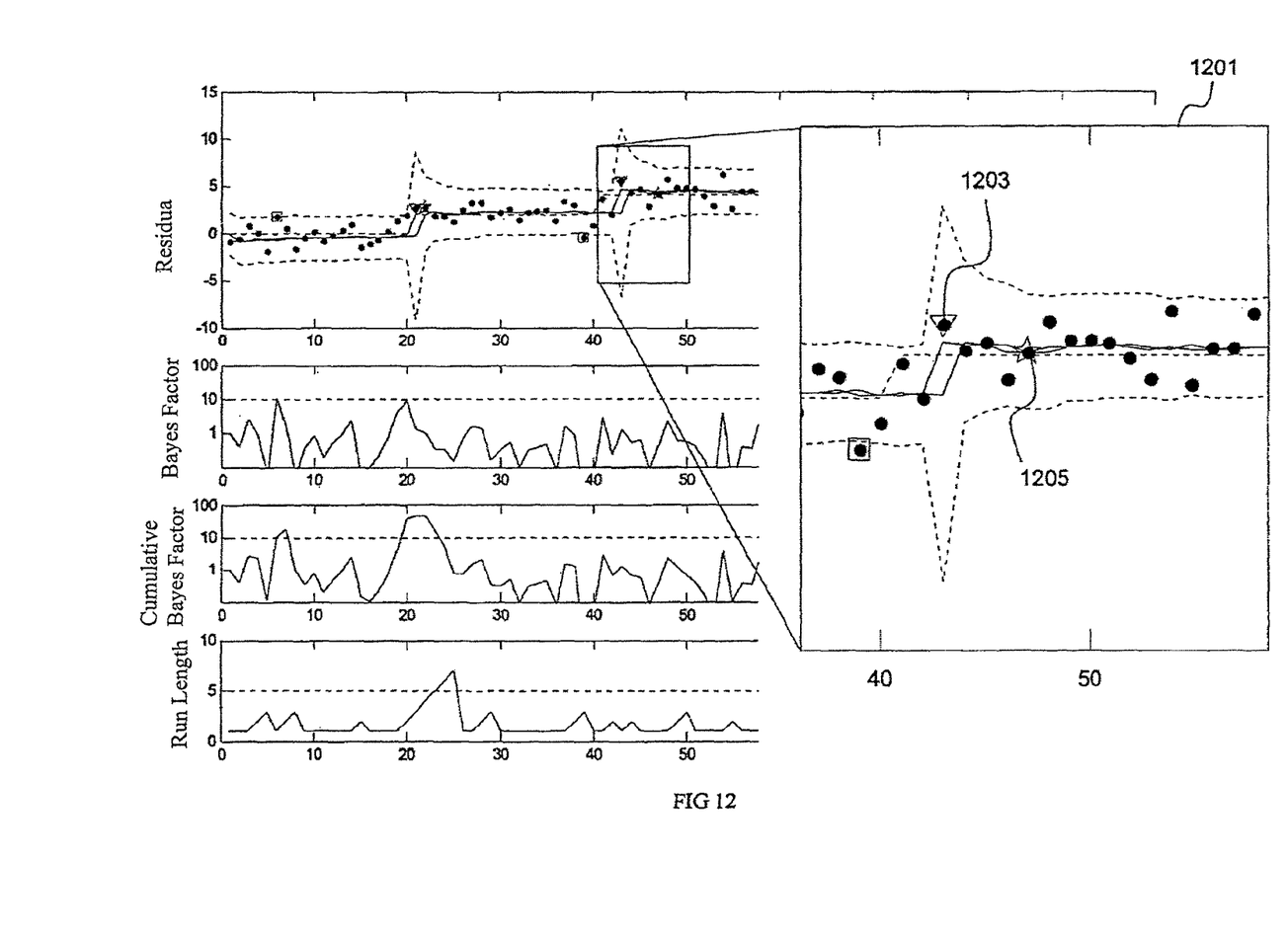

FIG. 11 shows the process curve with a corresponding model adaptation at time t=43. FIG. 12 shows a section 1201. It shows that the change was detected at t=48 (designated by 1205) and that the time of the change was calculated as t=43 (designated by 1203). The retrospectivity of the model adaptation is 4 time intervals.

Figure 13:
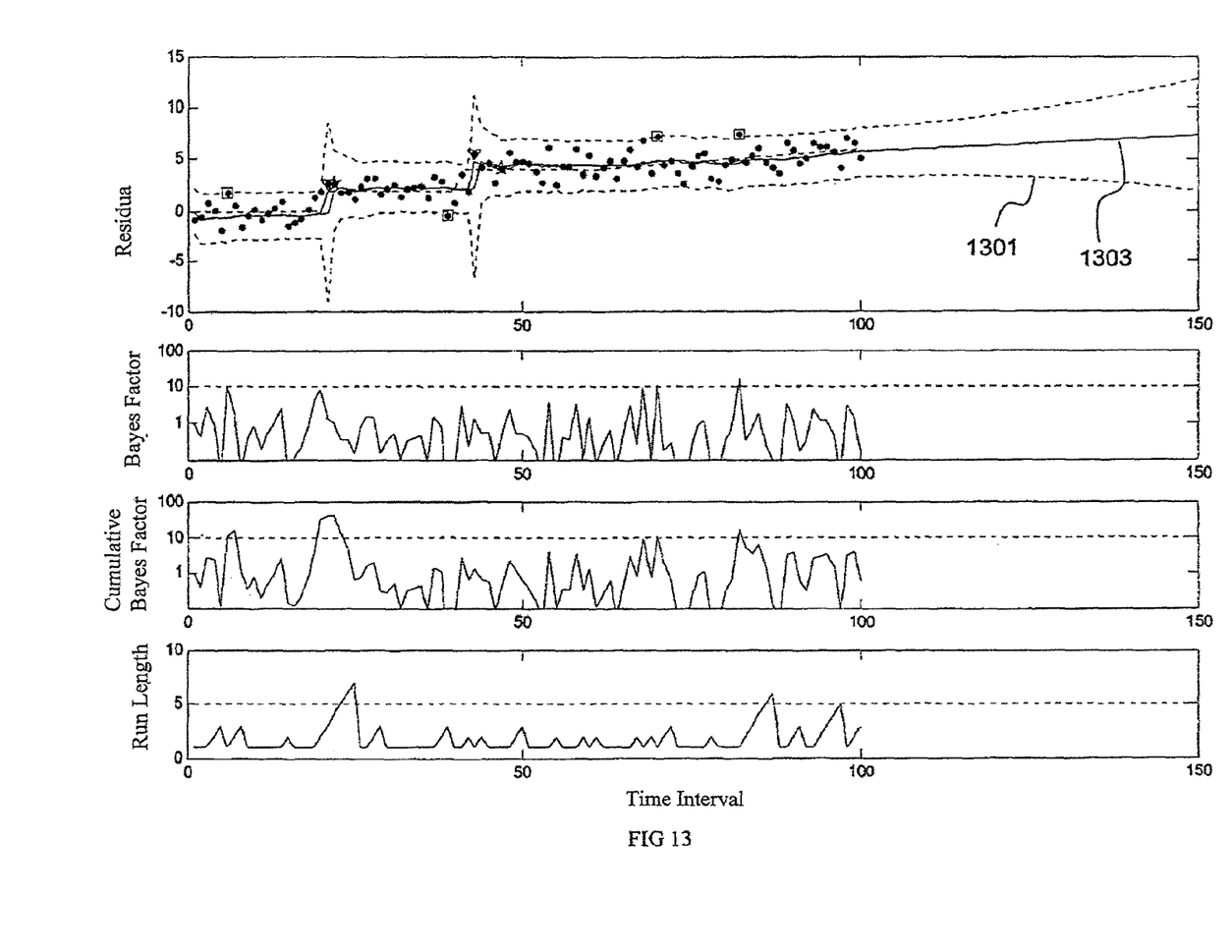

FIG. 13 shows a prognosis of the process. It shows that the prognosis 1303 when using a second order DLM runs linearly and that the imprecision 1301 increases over time.

In the case of expanding the method for positive and negative jumps, the following applies to the Bayes' factor $H_t$ when using the Gaussian distribution:

$$H_{1t} = \exp\left(\frac{2h \cdot (Y_t - f_t) - h^2}{2 \cdot Q_t}\right)$$

$$H_{2t} = \exp\left(\frac{-2h \cdot (Y_t - f_t) - h^2}{2 \cdot Q_t}\right)$$

Figure 14:
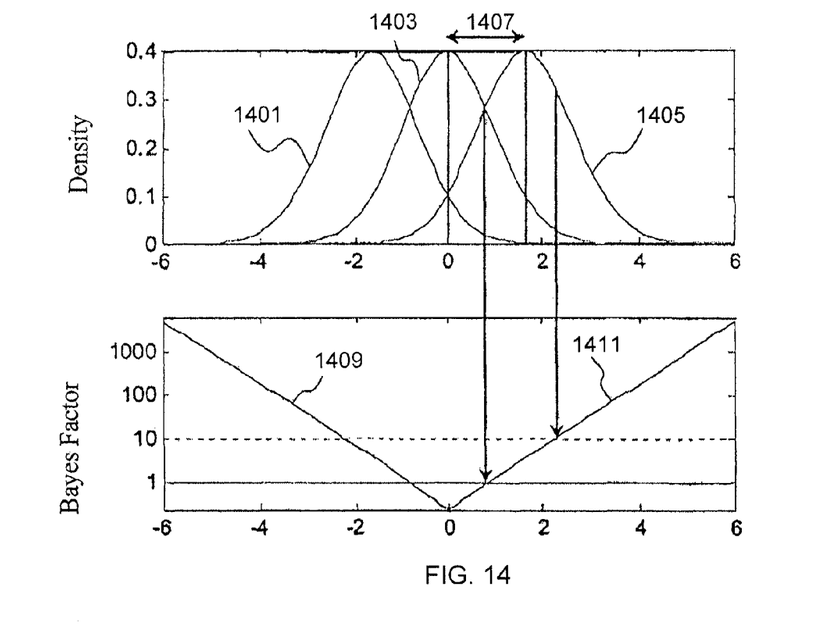
FIG. 14 illustrates an interrelationship between additional models and the Bayes' factor.

FIG. 14 shows the interrelationship between probability functions and Bayes' factors when expanding the method for positive and negative jumps. 1401 designates the probability density function of the alternative model "−h", 1403 that of the current model and 1405 that of the alternative model "+h". 1407 designates the offset of the mean value of the alternative model "+h" from the mean value of the current model. 1409 represents the progression of the Bayes' factor for negative jumps (model "−h") and 1411 for positive jumps (model "+h").

Figure 15:
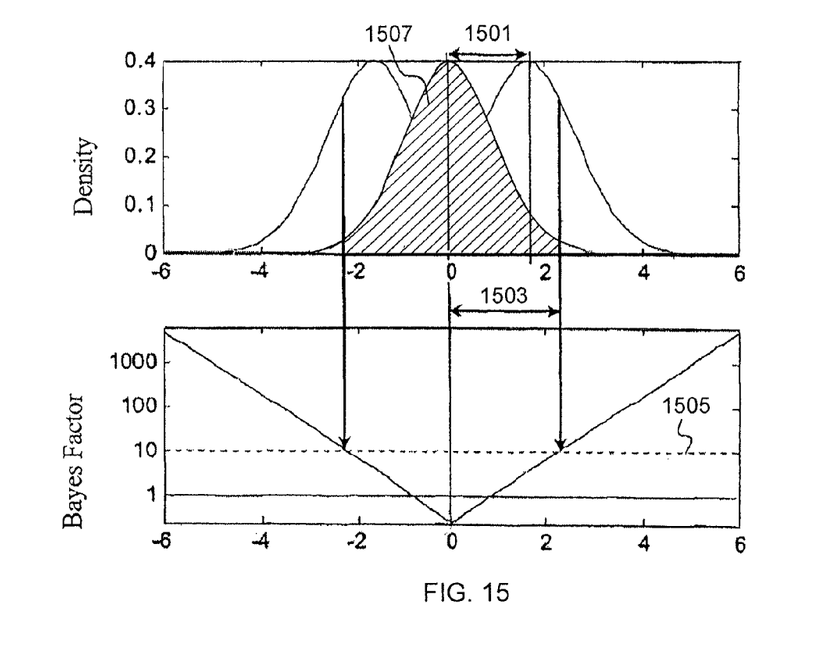
FIG. 15 illustrates an interrelationship between additional models and the Bayes' factor.

FIG. 15 shows a further interrelationship between the probability densities and the Bayes' factors. In accordance with the offset 1501, a width of the distribution of the current model 1503 is yielded in which Bayes' factors smaller than the threshold value 1505 occur. The size of the confidence interval 1507 can be determined with the aid of this width. In the depicted example, the offset is h=1.645 and the threshold value is τ=10 which leads to a width of the distribution of x=2.225. As a result, the size of the confidence interval is 97.56%, i.e., viewed statistically 97.56% of all residua lie within the confidence interval 1507.

To sum up, FIG. 4 shows the core of the invention, the algorithm for detecting outliers, intervention and prognosis.

An analysis of the information equations and the 1-step forecast equations can take place in a first step 401.

A check of the time t and in particular a comparison of the time t with a time tinter can take place in a second step 402. If a rapid change was detected in a previous run through of the algorithm, then t=tinter and a seventh step can be executed subsequently. If this is not the case, then a third step 403 can be executed.

In the third step 403, a check of the value H(t) and in particular a comparison of the value H(t) with the value τ can take place. If H(t)>τ, then an eighth step 408 can be executed subsequently. If this is not the case, a fourth step 404 can be executed.

In the fourth step 404, a check of the values H(t), H(t−1), L(t) and l(t) can take place. In particular, a comparison of the values H(t) and H(t−1) with the value τ can be made, a comparison of the value L(t) with t and a comparison of the value l(t) with lmin can be made. If H(t)>τ and H(t−1)>τ or L(t)>t and l(t)>lmin, then a ninth step 409 can be executed. If this is not the case, a fifth step 405 can be executed.

In the fifth step 405, an application of the update equations can take place.

After the fifth step 405, both the first step 401 as well as sixth step 406 may be executed.

In the sixth step 406, an application of the prognosis equations can take place.

In the seventh step 407, which may follow the second step 402, a setting of the mean value m(t) of the current model to the mean value of the residua from time interval t=tinter to t=tnotice and an increase in the value variance R can take place. After the seventh step 407, the third step 403 can be executed.

The eighth step 408, which may follow the third step 403, is focused on potential outliers:
1) Mark as outlier
2) Next time interval→t=t+1

After the eighth step 408, the first step 401 may be executed.

The ninth step 409, which can follow the fourth step 404, is focused on a rapid change:
1) Calculate time→tinter=t−l(t)
2) Notice time→tnotice=t
3) Demarcate outlier After the ninth step 409, the first step 401 may be executed. This may be a feedback intervention, i.e., a retrospective model adaptation.

The method for detecting outliers and intervention described on the basis of FIG. 4 may be based for the calculation of Bayes' factors.

The approach according to the invention makes it possible to safely detect rapid changes up to a jump height of 1.5·σ (σ=standard deviation of the residua). Up to a jump height of 1.0·σ, changes can be detected with a detection rate of approx. 70-80%.

With respect to the prognosis, the invention does not just provide a statement about the course of the residua, but also documents these with a probability density. As a result, it is possible to make a statement at any time about the probability of statically defined limit values being exceeded in the future.

Because of the property of matrix notation, it is possible without additional effort to increase the dimensions of dynamic linear model used and, therefore, describe and predict not only linear trends, but also higher order polynomial trends. In this case, however, the uncertainty of the prognoses increases.

The inventive method, the described algorithms and the calculations for solving the described equations may be implemented in hardware or in software. For example, the device for monitoring a gas turbine may have appropriate circuits or processors. The approach according to the invention is not restricted to monitoring a gas turbine, but can also be used to monitor other turbines or systems.

What is claimed is:

1. A device for monitoring a gas turbine, comprising:
   a receiver, wherein the receiver receives condition values of the gas turbine; and
   an analytical device, wherein the analytical device determines condition information from the condition values of the gas turbine using Bayes' Prediction and wherein the analytical device identifies a rapid change in the condition values as condition information.

2. The device according to claim 1, wherein the analytical device identifies a prognosis about a future course of the condition values as condition information.

3. The device according to claim 1, wherein the analytical device determines the condition information by a comparison of a cumulative Bayes' factor with a threshold value.

4. The device according to claim 1, wherein the condition values are measured values of the gas turbine.

5. The device according to claim 1, wherein the condition values are residua which identify a deviation of a measured value from an expected value assigned to the measured value.

6. The device according to claim 1, wherein the Bayes' Prediction includes a description of the condition values by at least a dynamic linear model.

7. The device according to claim 6, wherein the dynamic linear model describes at least one linear trend of the condition values.

8. The device according to claim 6, wherein the dynamic linear model describes at least one higher order polynomial trend of the condition values.

9. A device for monitoring a gas turbine, comprising:
- a receiver, wherein the receiver receives condition values of the gas turbine; and
- an analytical device, wherein the analytical device determines condition information from the condition values of the gas turbine using Bayes' Prediction;
- wherein the Bayes' Prediction includes a description of the condition values by at least a dynamic linear model;
- and wherein the Bayes' Prediction includes a determination of a probability density of a current dynamic linear model and a determination of a probability density of an alternative dynamic linear model, wherein a mean value of the alternative dynamic linear model is offset by a specific value with respect to the current dynamic linear model.

10. The device according to claim 9, wherein the Bayes' Prediction includes a comparison of the probability density of the current dynamic linear model with the probability density of the alternative dynamic linear model.

11. The device according to claim 9, wherein the Bayes' Prediction includes a determination of Bayes' factors from the probability density of the current dynamic linear model and the probability density of the alternative dynamic linear model.

* * * * *